(12) United States Patent
Blankenship et al.

(10) Patent No.: US 10,321,295 B2
(45) Date of Patent: Jun. 11, 2019

(54) SYSTEM AND METHOD FOR DETECTING A CELLULAR DEVICE

(71) Applicant: Epiq Solutions, Schaumburg, IL (US)

(72) Inventors: Keith Blankenship, Schaumburg, IL (US); John Orlando, Schaumburg, IL (US); Aaron Madsen, Schaumburg, IL (US); Michael Johnson, Schaumburg, IL (US)

(73) Assignee: Epiq Solutions, Schaumburg, IL (US)

( * ) Notice: Subject to any disclaimer, the term of this patent is extended or adjusted under 35 U.S.C. 154(b) by 0 days.

(21) Appl. No.: 15/377,589

(22) Filed: Dec. 13, 2016

(65) Prior Publication Data
US 2018/0167798 A1   Jun. 14, 2018

(51) Int. Cl.
*H04W 8/00* (2009.01)
*H04W 48/10* (2009.01)
*H04W 4/02* (2018.01)
*H04W 8/18* (2009.01)

(52) U.S. Cl.
CPC ............ *H04W 8/005* (2013.01); *H04W 4/02* (2013.01); *H04W 8/18* (2013.01); *H04W 48/10* (2013.01)

(58) Field of Classification Search
None
See application file for complete search history.

(56) References Cited

U.S. PATENT DOCUMENTS

| | | | | |
|---|---|---|---|---|
| 5,428,667 | A | * | 6/1995 | Easterling ............... H04L 63/30 455/405 |
| 2006/0217121 | A1 | * | 9/2006 | Soliman ................ H04W 16/32 455/446 |
| 2008/0220749 | A1 | * | 9/2008 | Pridmore ................. H04K 3/65 455/414.1 |

OTHER PUBLICATIONS

How Detectors Sniff Out Cell Phones Up to a Mile Away, Berkeley Varitronics Systems, https://www.bvsystems.com/wp-content/uploads/2015/04/How_Detectors_Sniff_Out_Cell_Phones_Up_To_A_Mile_Away.pdf downloaded Dec. 12, 2016 (2 pages).

(Continued)

*Primary Examiner* — German Viana Di Prisco
(74) *Attorney, Agent, or Firm* — McAndrews, Held & Malloy, Ltd.

(57) ABSTRACT

Methods and systems for cellular device detection are presented. A signal processing receiver operable to determine a plurality of uplink parameters according to a downlink broadcast message. The signal processing receiver is also configurable to receive an uplink message according to the plurality of uplink parameters, thereby determining a presence and/or an identity of a cellular device by decoding the uplink message.

15 Claims, 3 Drawing Sheets

(56) References Cited

OTHER PUBLICATIONS

The Pros & Cons of Cell Phone Detection Methods, Berkeley Varitronics Systems, https://www.bvsystems.com/wp-content/uploads/2015/04/Pros_and_Cons_of_Cell_Phone_Detection.pdf; downloaded Dec. 12, 2016 (2 pages).

Cellphone detector TransitHound, Cell Phone Detection for Distracted Operators, Berkeley Varitronics Systems, https://www.bvsystems.com/wp-content/uploads/2015/11/TransitHound.pdf; downloaded Dec. 12, 2016(2 pages).

TransitHound, Cellphone Detector, User Manual Version 1.4, https://www.bvsystems.com/wp-content/uploads/2015/11/TransitHound_User_Manual.pdf; downloaded Dec. 12, 2016 (12 pages).

Cellphone Monitor WatchHound, 24-7 Cell Phone Security Monitor, Berkeley Varitronics Systems, http://www.bundpol.com/detect/pdf-loads/Watchhound-ENGLISH.pdf; downloaded Dec. 12, 2016 (2 pages).

Cellphone Monitor WatchHound, User's Manual Version 1.5, https://www.bvsystems.com/Tech/Manuals/WatchHound1.5.pdf; downloaded Dec. 12, 2016 (43 pages).

\* cited by examiner

SYSTEM AND METHOD FOR DETECTING A CELLULAR DEVICE

BACKGROUND

Limitations and disadvantages of conventional methods and systems for detecting a cellular device will become apparent to one of skill in the art, through comparison of such systems with some aspects of the present invention as set forth in the remainder of the present application with reference to the drawings.

BRIEF SUMMARY OF THE INVENTION

Systems and methods are provided for accurate detection of a cellular device, substantially as shown in and/or described in connection with at least one of the figures, as set forth more completely in the claims.

Advantages, aspects and novel features of the present disclosure, as well as details of an illustrated embodiment thereof, will be more fully understood from the following description and drawings.

DETAILED DESCRIPTION OF THE INVENTION

Accurate detection of cellular devices in a given locality is desired for numerous security, safety, and regulatory reasons.

Figure 1:
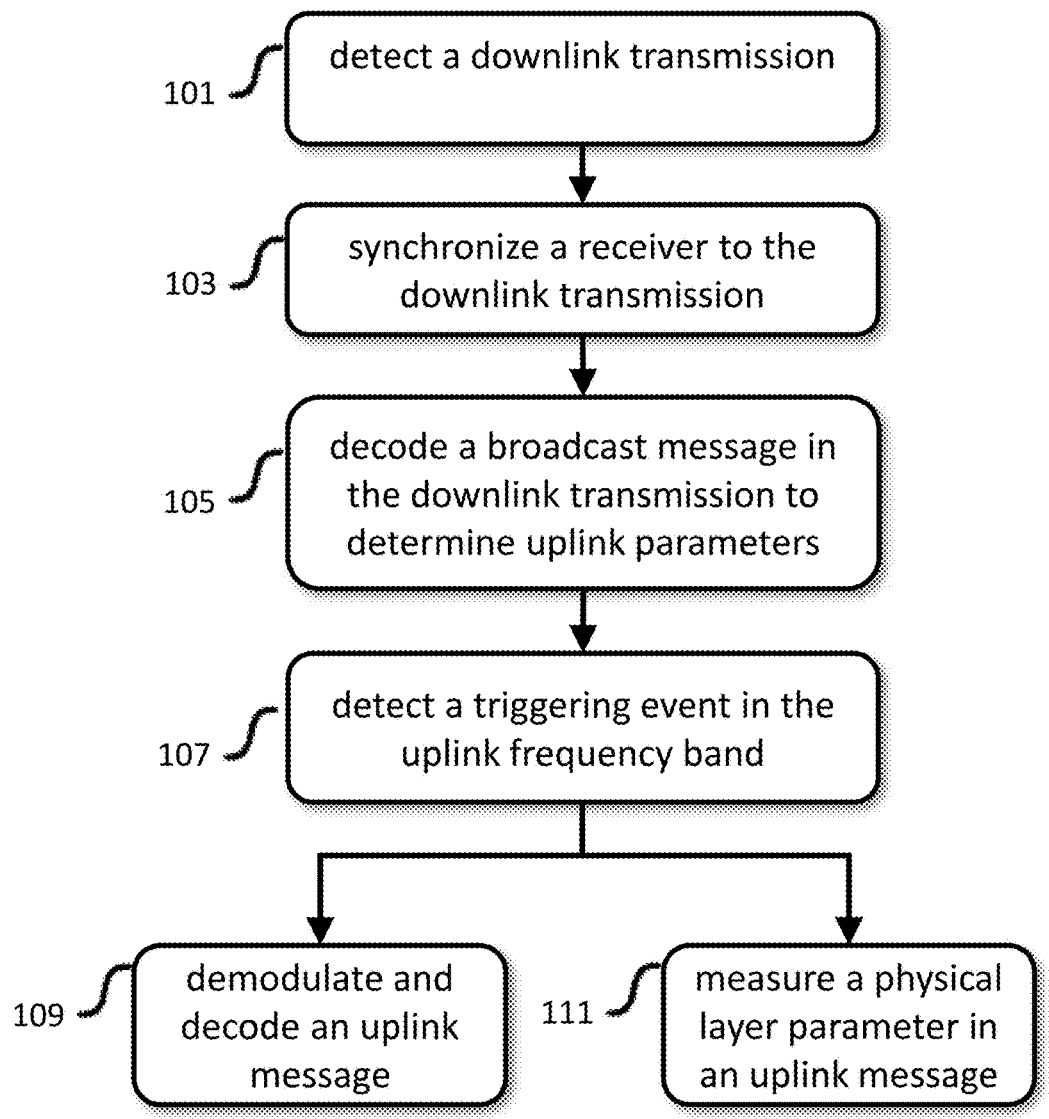
FIG. 1 is a flowchart illustrating an example process for accurate detection of a cellular device in accordance with aspects of this disclosure.

FIG. 1 is a flowchart illustrating an example process for accurate detection of a cellular device in accordance with aspects of this disclosure. The process in FIG. 1 begins with block 101 in which a downlink transmission from a basestation is detected. The downlink transmission may be detected, for example, by a radio frequency (RF) signal processing receiver. The RF signal processing receiver may comprise a cellular network survey tool for performing a cellular network scan/survey across all downlink cellular bands of interest.

The cellular network scan may operate on a wideband signal comprising multiple frequency bands. For example, a wideband frequency analysis may comprise capturing signals in a wideband during one time period and then analyzing the spectrum to identify one or more potential downlink channels. Alternatively, the cellular network scan may operate on a narrowband signal comprising a portion of one frequency band, one frequency band, or a few frequency bands. The narrowband frequency analysis may identify potential downlink channels sequentially in realtime as a receiver is tuned across a plurality of downlink frequency bands.

In block 103, the RF signal processing receiver is synchronized to the downlink transmission detected in block 101. The detection of the downlink transmission, in block 101, and the synchronization to the downlink transmission, in block 103, may be attempted in every band allocated for use by the cellular standards. Alternatively, this scanning process may be across a more limited set of frequencies, such as the bands that are licensed for use in a given region. The detection of the downlink transmission, in block 101, and the synchronization to the downlink transmission, in block 103, may also be conducted for one or more particular cellular technologies, e.g., GSM, UMTS, CDMA2K, EVDO, FD-LTE, and TD-LTE.

During a cellular network survey, synchronization, in block 103, may be attempted for each cellular basestation whose downlink RF transmission is detected, in block 101. Cell synchronization may achieve both frequency and timing synchronization with a cellular basestation. Cell synchronization may also yield details of the frame structure and timing used by the particular basestation.

When the RF signal processing receiver is synchronized with a particular basestation, downlink broadcast messages from a basestation can be received, demodulated and decoded, in block 105. Successful decoding of these broadcast messages, in block 105, confirms the presence of the basestation, the cellular technology employed by the basestation (e.g., GSM, UMTS, FD-LTE, etc.), and the RF downlink frequency, channel and/or band. The basestation's confirmed cellular technology, downlink frequency, channel and/or band may be used to define uplink parameters, such as an allowable uplink frequency, channel and/or band for a cellular device. A cellular standard may, for example, pair uplink frequencies with downlink frequencies. The cellular carrier (e.g., AT&T, T-Mobile, Verizon, etc.) may also be determined by decoding the Mobile Network Code (MNC) in a basestation's broadcast message.

The basestation's broadcast messages in combination with the confirmed properties of a basestation may determine how cellular devices are expected to request access to the cellular network. Determining how a cellular device is expected to request access to a network varies across cellular technologies and cellular providers but is typically defined by how the cellular provider advertises the expected use of the Random Access Channel (RACH) or similar access-related channel in the respective cellular technology.

The standard associated with the confirmed cellular technology of a basestation may define how a cellular device is expected to send RACH messages or similar access-related messages to request access to the network. For example, LTE specifies this in the System Information Broadcast 2 message, and UMTS specifies the RACH configuration in System Information Broadcast 5 message.

If the cellular technology of a candidate basestation is unknown, a complete cellular network survey may require the receiver to repeat basestation analysis, in blocks 101, 103 and 105, for the possible cellular technologies. The contents of the broadcast messages that were successfully decoded may be stored in a Cell Network Descriptor List (CNDL). The CNDL may also store additional relevant data such as the cellular technology and frequency of the uplink network access request. Entries in the CNDL may also be associated with a GPS location. Additionally, the CNDL of one RF signal processing receiver may be shared with other RF signal processing receivers. These other RF signal processing receivers can be either collocated with or remote from the RF signal processing receiver which produced the CNDL.

The CNDL may be sorted based on a received signal strength indicator (RSSI), a received signal quality, or other fields within the CNDL. A sorted CNDL may be more appropriate for prioritizing basestations to which a nearby cellular device is likely to request access. A sorted or unsorted CNDL can be used to either manually or automatically task one or more flexible RF signal processing receivers. These receivers may be the same platform used to perform the cellular network survey, in blocks 101, 103 and 105.

One or more RF signal processing receivers attempt to receive an uplink transmission at an uplink frequency as dictated by an entry in the CNDL. Each of the one or more RF signal processing receivers will be directed to tune to the RF frequency associated with an RF uplink channel and attempt to detect when a cellular device requests access to the network. The configuration of each RF signal processing receiver is determined by the cellular basestation's broadcast messages that are logged in the CNDL.

While the presence of RF power in an uplink cellular band can be an indicator that a cellular device is requesting network access, RF power alone cannot definitively identify a cellular device. Though the cellular uplink bands are licensed bands, and thus only licensed devices are allowed to transmit in these bands, it is quite common to have sporadic and unintended RF signals in these bands. Without further qualification, sporadic and unintended RF signals could be falsely identified as cellular devices requesting network access. Systems that rely on RF power alone in an uplink cellular band to identify cellular device requesting network access often suffer from a high false positive rate and thus exhibit poor reliability and/or usability.

A properly configured RF signal processing receiver attempts to detect a triggering event in a cellular uplink frequency band in block 107. The triggering event in a cellular uplink band may include a high RF power level, a likely presence of a known sequence or signal within the received signal, or specific properties or structures of the received signal which indicate the received signal is likely structured instead of random noise. One example of signal properties or structures is signal autocorrelation.

In some cellular systems, the uplink transmissions are channelized or localized in the frequency domain. One example of this is LTE, where uplink transmissions are localized to be certain multiples of a resource block, which is 12 subcarriers, each 15 kHz wide, for a total of 180 kHz. In such cases, it may be advantageous to process the uplink signal in the frequency domain to detect the triggering event. For example, the uplink signal may be transformed into the frequency domain, and a triggering event declared when the power in a frequency bin exceeds a threshold.

In some cellular systems, e.g., UMTS and LTE, one or more basestations in the CNDL may use the same uplink frequency. In such cases, it may possible to use a single signal processing receiver to detect access attempts to any one of the basestations that use the same frequency. This can happen, for instance, if the cellular technology defines access attempts to the different basestations according to a different known sequence in the uplink signal.

Multiple signal processing devices, either collocated or remote from each other, may operate simultaneously in block 107. A triggering event, and thus a detection, can be confirmed when more than one signal processing receiver indicate a triggering event. Furthermore, RSSI measurements from the aggregated signal processing receivers can be used to locate the cellular device in space.

The RF signal processing receiver may then attempt to demodulate and decode the initial message or sequence (e.g., network access request) sent by the cellular device in block 109. In general, various parameters from the basestation's broadcast messages that are logged into the CNDL must be known used for efficiently receiving, demodulating, and decoding of the initial message sent by the cellular device. If the RF signal processing receiver successfully decodes a network access request at block 109, the presence of a transmitting cellular device is definitively determined. Detecting and decoding the first message from a cellular device to the incumbent network to start the channel request process may be sufficient to confirm a transmitting cellular device is present.

Uplink messages may also be used to uniquely identify the cellular device via an electronic identifier. To decode the electronic identifier, it may be necessary to receive and decode multiple messages sent by the cellular device during the initial channel request procedure. These messages may contain the electronic identifier or a form thereof that is unique to that cellular device at a particular time and location. Depending on the cellular technology employed, the electronic identifier of the cellular device may be present in the initial RACH or similar access-related message, or may come in a later message in the sequence (such as the Radio Resource Connection Request message). The electronic identifier may also come in some alternate messaging sequence.

In some cases, it may be necessary to capture and process the downlink signal to demodulate and decode later uplink messages in the sequence. For example, in LTE, a detection of RACH preamble may be used as the triggering event. To demodulate and decode the following Radio Resource Connection Request message sent on the uplink, it may be necessary to capture and process the downlink to discover the Random Access Response sent on the downlink by the basestation to the cellular device in response to the RACH preamble. The Random Access Response will contain the parameters necessary to demodulate and decode the subsequent Radio Resource Connection Request message sent on the uplink from the cellular device to the basestation. The Radio Resource Connection Request message may contain the electronic identifier for the cellular device.

In addition to or in place of demodulating and decoding the initial message sent by the cellular device in block 109, a physical layer measurement may be performed on a potential uplink message in block 111. A cellular device may be confirmed by the physical layer measurement instead of, or in addition to, a successful demodulation and decode of the uplink transmission. For example, a high signal-to-noise ratio (SNR) measurement for a known sequence in the uplink signal may be used to confirm the presence of a cellular device. An example of this is the UMTS technology, where a cellular device could be confirmed by measuring a high SNR for the pilot channel. As a further example of confirmation by physical layer measurement, in UMTS a cellular device may be confirmed by detecting the transport format combination indicator (TFCI) transmission of the cellular device, where either the TFCI transmission is decoded correctly or the TFCI transmission is deemed to be received with high SNR by the RF signal processing receiver.

An RSSI measurement may also be determined, based on the received power of the RF signal. An RSSI may be determined for both the basestation signal and the cellular device signal. RSSI of the basestation signal and/or the cellular device signal may be used for determining proximity to the cellular device.

Figure 2:
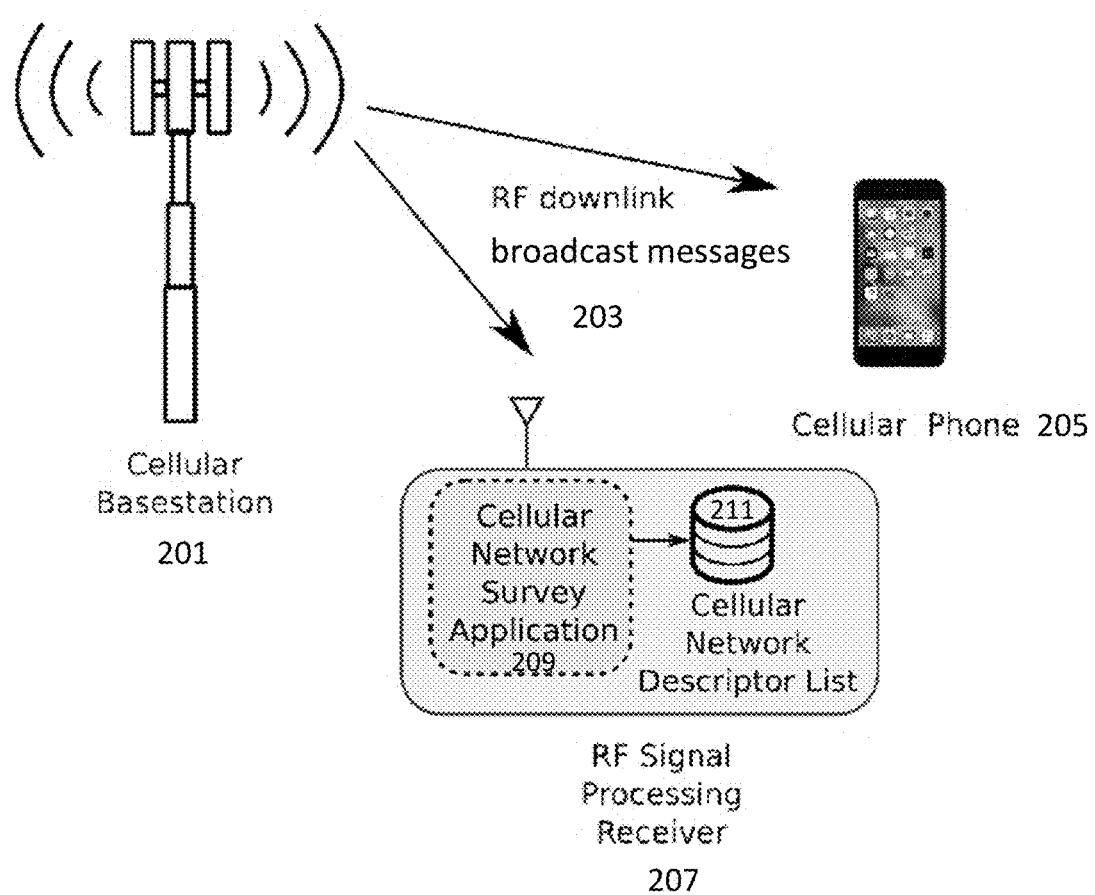
FIG. 2 shows a system for detection of and synchronization with a basestation in accordance with aspects of this disclosure.
Figure 3:
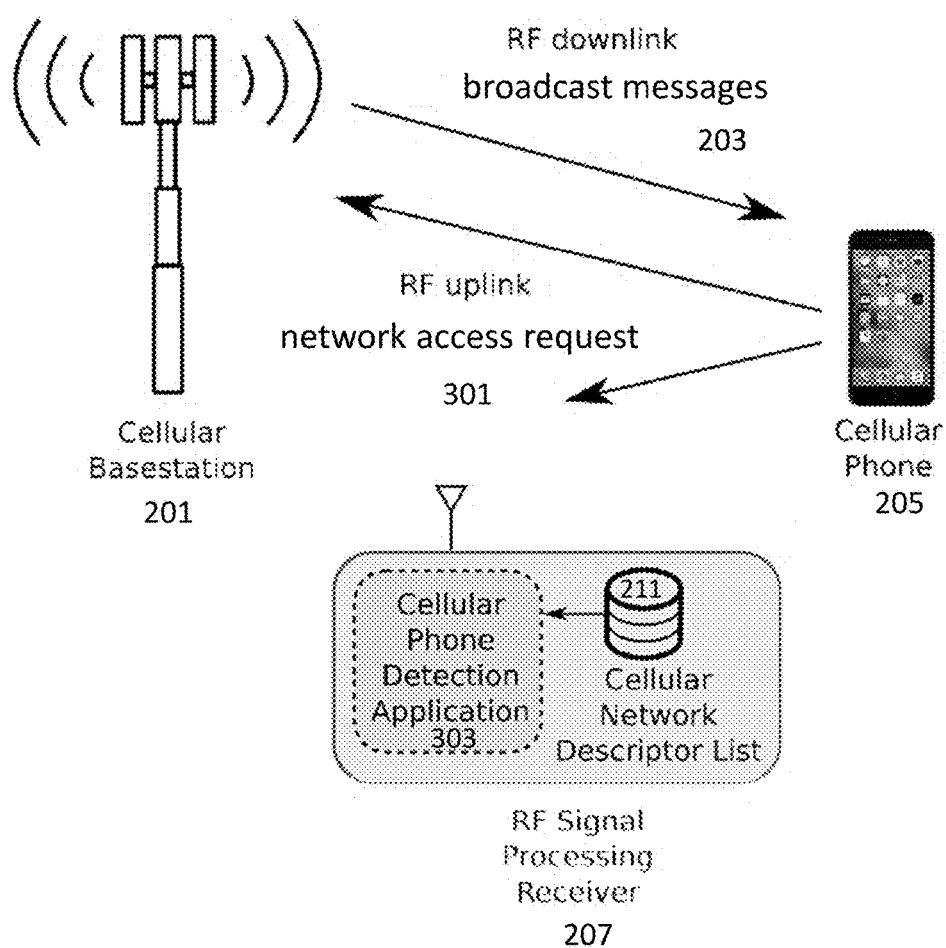
FIG. 3 shows a system for reception and detection of an uplink message from a cellular device in accordance with aspects of this disclosure.

The process in FIG. 1 may be described further with reference to FIG. 2 and FIG. 3. While FIG. 2 and FIG. 3 illustrate a cellular basestation 201 and a cellular phone 205, the process may be implemented to detect any cellular device. A cellular device is any device with embedded cellular capability which is capable to access the cellular network.

FIG. 2 shows a system for detection of and synchronization with a basestation in accordance with aspects of this disclosure. The system in FIG. 2 comprises a cellular basestation 201, a cellular phone 205 and an RF signal processing receiver 207.

The cellular basestation 201 sends an RF downlink broadcast message 203 to all cellular devices (e.g., cellular phone 205) in a local area, i.e., in a cell. This downlink broadcast message 203 may be detected and received by the cellular phone 205 and the RF signal processing receiver 207.

The RF signal processing receiver 207 may comprise a cellular network survey tool/application 209 that is able to perform a cellular network scan/survey across all downlink cellular bands of interest. Therefore, the cellular network survey application 209 may direct the RF signal processing receiver 207 to detect and receive downlink broadcast message from basestations in addition to the cellular basestation 201 as illustrated.

In some situations, a full cellular network scan may comprise scanning thousands of potential channels on which signals may exist. In some signal processing receivers, for example where the signal processing occurs largely in a software programmable device such as a microprocessor or digital signal processor, this may lead to excessive scan times of, for example, many hours. To increase processing performance, the FPGA may be used as an alternative to the software programmable device. On each potential channel, a detection algorithm may be run to detect a particular downlink signal structure or to detect a known sequence which occurs frequently within the signal. If a positive detection occurs, the potential channel is marked as a candidate channel. Candidate channels may subsequently processed more extensively to confirm the channel. This two-step approach can quickly eliminate a significant number of potential channels where no signal exists, thus speeding up the scan process.

The RF signal processing receiver 207 attempts to synchronize with a downlink broadcast message (e.g., downlink broadcast message 203). Synchronization with a downlink broadcast message 203 may achieve both frequency and timing synchronization with the cellular basestation 201. This synchronization may also yield details of the frame structure and timing used by the basestation 201.

When the RF signal processing receiver 207 is synchronized with the basestation 201, downlink broadcast messages 203 from the basestation 201 can be received, demodulated and decoded. Successful decoding of these broadcast messages confirms the presence of the basestation 201, the cellular technology employed by the basestation 201 (e.g., GSM, UMTS, FD-LTE, etc.), and the RF downlink frequency, channel and/or band used by the basestation 201. The confirmed cellular technology, downlink frequency, channel and/or band of the basestation 201 may be used to define an allowable uplink frequency, channel and/or band for the cellular phone 205. The cellular carrier (e.g., AT&T, T-Mobile, Verizon, etc.) of the cellular phone 205 may also be determined by decoding the Mobile Network Code (MNC) in the broadcast message 203.

The basestation's broadcast messages 203 in combination with the confirmed properties of the basestation 201 may determine how the cellular phone 205 is expected to request access to the network. The process of requesting access to a network varies across cellular technologies and cellular providers but is typically defined by how the cellular provider advertises the expected use of the Random Access Channel (RACH) or similar access-related channel in the respective cellular technology.

The standard associated with the confirmed cellular technology of the basestation 201 may define how the cellular phone 205 is expected to send RACH messages to request access to the network. For example, LTE specifies this in the System Information Broadcast 2 message, and UMTS specifies the RACH configuration in System Information Broadcast 5 message.

If the cellular technology of basestation 201 is unknown, a survey for all possible cellular technologies may be required. The contents of the broadcast messages 203 that were successfully decoded may be stored in a Cell Network Descriptor List (CNDL) 211. The CNDL 211 may also store additional relevant data such as the cellular technology and frequency of the uplink network access request. The CNDL 211 may be subsequently sorted based on a received signal strength indicator (RSSI), a received signal quality, or other fields within the CNDL. A sorted CNDL may be more appropriate for prioritizing basestations to which a nearby cellular device is likely to request access.

FIG. 3 shows a system for reception and detection of an uplink message 301 from a cellular device in accordance with aspects of this disclosure. As in FIG. 2, the system in FIG. 3 comprises a cellular basestation 201, a cellular phone 205 and an RF signal processing receiver 207.

When basestation 201 has been identified by the cellular network survey application 209 in FIG. 2, the CNDL 211 can be used to either manually or automatically task one or more flexible RF signal processing receivers 207. To efficiently detect a cellular phone 205 it may be necessary to sort the CNDL based on RSSI, received signal quality, or other fields within the CNDL. The sorted CNDL may be more appropriate for prioritizing basestations to which a cellular phone 205 is likely to request access. These receivers 207 may be the same platform used to perform the cellular network survey. Alternatively, the one or more flexible RF signal processing receivers 207 may be additional devices operably coupled to the CNDL 211. The configuration of each RF signal processing receiver 207 is determined by the cellular basestation's broadcast messages 203 that are logged in the CNDL 211.

One or more RF signal processing receivers 207 attempt to receive an uplink transmission 301 at an uplink frequency as dictated by an entry in the CNDL. Each of the one or more RF signal processing receivers 207 will be directed by a cellular phone/device detection application 303 to tune to the RF frequency associated with an RF uplink channel 301. Each of the one or more RF signal processing receivers 207 attempts to detect a triggering event. The triggering event in a cellular uplink band may include a high RF power level, a likely presence of a known sequence or signal within the received signal, or specific properties or structures of the received signal which indicate the received signal is likely structured instead of random noise. The triggering event indicates that a cellular device (e.g., cellular phone 205) may be requesting network access. For example, cellular phone 205 requests network access by transmitting an RF uplink network access request message 301. This RF uplink network access request message 301 may be detected by the basestation 201 as well as the RF signal processing receiver 207.

The mere presence of RF power in the bands licensed for uplink cellular traffic may or may not be from cellular phone 205. Though the cellular uplink bands are licensed bands, and thus only licensed devices are allowed to transmit in these bands, it is quite common to have sporadic and unintended RF signals in these bands that could be detected as falsely identified as cellular devices requesting network. Therefore, when the RF signal processing receiver 207 detects power in a cellular uplink band, the RF signal processing receiver 207 may attempt to demodulate and decode a message. If the RF signal processing receiver 207 successfully decodes a network access request 301, the presence of a transmitting cellular device (e.g., cellular phone 205) is definitively determined. Detecting and decoding the first message transmission 301 from cellular phone 205 to the basestation 201 may be sufficient to confirm cellular phone 205 is present and transmitting.

A signal processing receiver may comprise a microprocessor, digital signal processor, or other software programmable device. However, such devices may have limited ability to continually process real time signals. Additionally, such devices may need to handle other tasks within a signal processing receiving system. Thus, they may not be suitable for detecting a triggering event, where the channel needs to be continually monitored in real time. In such cases, it may be advantageous to use a Field Programmable Gate Array (FPGA) to continually monitor the uplink band for the triggering event. In such an implementation, the software programmable device may operate on other tasks while awaiting the triggering event. When the triggering event occurs, the sampled signal is passed from the FPGA to the software programmable device for subsequent demodulation and decoding.

Cellular phone 205 may also be uniquely identified by an electronic identifier. To decode the electronic identifier, it may be necessary to receive and decode multiple messages 301 sent by cellular phone 205 and/or basestation 201 during the initial network access request procedure. These messages 301 may contain some form of the electronic identifier that is unique to cellular phone 205 at a particular time in a particular local area. Depending on the cellular technology employed, the electronic identifier of cellular phone 205 may be present in the initial RACH message, or may come in a later message in the sequence (such as the Radio Resource Connection Request message), or may come in some alternate messaging sequence.

An RSSI measurement may also be determined, based on the received power of the RF signal. An RSSI may be determined for both the basestation signal and the cellular device signal. RSSI of the basestation signal 203 and/or the cellular device signal 301 may be used for determining proximity to the cellular device 205.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for detecting a cellular device with a signal processing receiver, the method comprising:
    determining a plurality of uplink parameters based on a downlink broadcast message;
    configuring the signal processing receiver to receive an uplink message according to the plurality of uplink parameters, wherein the uplink message is transmitted by a cellular device in response to the downlink broadcast message; and
    detecting the cellular device by processing the uplink message.

2. The method of claim 1, wherein processing the uplink message comprises decoding the uplink message.

3. The method of claim 1, wherein processing the uplink message comprises measuring a physical layer parameter of the uplink message.

4. The method of claim 1, wherein determining the plurality of uplink parameters comprises decoding a downlink broadcast message.

5. The method of claim 1, wherein the plurality of uplink parameters comprises a time basis and/or a frequency basis for an uplink frame.

6. The method of claim 1, wherein the plurality of uplink parameters corresponds to a particular cellular basestation and the plurality of uplink parameters is stored as an entry in a list, the list comprising a plurality of entries, each entry corresponding to one of a plurality of basestations.

7. The method of claim 6, wherein the list is shared between each of a plurality of signal processing receivers.

8. The method of claim 1, wherein the method comprises identifying the cellular device by decoding an electronic identifier in the uplink message.

9. A system comprising:
a signal processing receiver operable to determine an uplink band based on a downlink broadcast message, the signal processing receiver being operable to determine that a cellular device is active based on an uplink message in the uplink band, wherein the uplink message is transmitted by the cellular device in response to the downlink broadcast message; and
a memory operable to store the uplink band.

10. The system of claim 9, wherein the cellular device is a cellular phone.

11. The system of claim 9, wherein the signal processing receiver is operable to decode the downlink broadcast message.

12. The system of claim 9, wherein the signal processing receiver is operable to determine a time basis and/or a frequency basis for an uplink frame.

13. The system of claim 9, wherein data in the memory is shared between each of a plurality of signal processing receivers.

14. The system of claim 9, wherein the signal processing receiver is operable to identify the cellular device by decoding an electronic identifier in the uplink message.

15. The system of claim 9, wherein the signal processing receiver is operable to identify a service provider from the downlink broadcast message.

* * * * *